United States Patent [19]

Lehr

[11] 4,099,778

[45] Jul. 11, 1978

[54] RETENTION INSTALLATION FOR CHILDREN IN MOTOR VEHICLES

[75] Inventor: Werner Lehr, Munich, Fed. Rep. of Germany

[73] Assignee: Bayerische Motoren Werke Aktiengesellschaft, Fed. Rep. of Germany

[21] Appl. No.: 728,624

[22] Filed: Oct. 1, 1976

[30] Foreign Application Priority Data

Oct. 3, 1975 [DE] Fed. Rep. of Germany ....... 2544274

[51] Int. Cl.² .............................................. A62B 35/00
[52] U.S. Cl. .................................... 297/386; 280/747; 297/389
[58] Field of Search .............. 297/384, 385, 386, 388, 297/389, 216; 280/747, 744, 746; 244/122 B; 128/134

[56] References Cited

U.S. PATENT DOCUMENTS

| | | | |
|---|---|---|---|
| 1,898,090 | 2/1933 | Lethern | 280/747 |
| 2,576,867 | 11/1951 | Wilson, Jr. | 280/747 |
| 2,898,976 | 8/1959 | Barecki | 280/747 |
| 3,258,293 | 6/1966 | Sharp | 297/385 |
| 3,380,776 | 4/1968 | Dillender | 297/389 |
| 3,471,197 | 10/1969 | Ely | 297/216 |
| 3,529,864 | 9/1970 | Rose et al. | 297/387 |
| 3,534,979 | 10/1970 | Barecki et al. | 280/746 |
| 3,567,247 | 4/1971 | Sobkow et al. | 297/389 X |
| 3,819,197 | 6/1974 | Shakespear | 297/388 |
| 3,834,758 | 9/1974 | Soule | 297/389 |
| 3,868,143 | 2/1975 | Reilly | 297/385 |
| 3,888,541 | 6/1975 | Stephenson | 297/389 |
| 3,891,272 | 6/1975 | Takada | 297/386 |
| 3,941,404 | 3/1976 | Otaegui-Ugarte | 244/122 B |
| 3,971,569 | 7/1976 | Abe | 280/747 |

FOREIGN PATENT DOCUMENTS

| | | | |
|---|---|---|---|
| 1,283,315 | 12/1960 | France | 280/747 |
| 2,415,578 | 7/1974 | Fed. Rep. of Germany | 297/389 |
| 2,233,856 | 1/1974 | Fed. Rep. of Germany | 297/389 |
| 2,034,740 | 1/1972 | Fed. Rep. of Germany | 280/747 |
| 993,396 | 5/1965 | United Kingdom | 297/389 |
| 1,010,272 | 11/1965 | United Kingdom | 297/384 |
| 1,287,698 | 9/1972 | United Kingdom | 297/386 |

Primary Examiner—James T. McCall
Attorney, Agent, or Firm—Craig & Antonelli

[57] ABSTRACT

An installation for the retention of children on rear seats in motor vehicles with a chest belt and a lower body belt, in which the chest belt is connected with two belt-bands which are arranged extending behind the child over a backrest of the seat and, on the one hand, form the lower body belt by means of their end sections that are deflected in the corner area of the seat surface and backrest while, on the other, they cooperate by way of one or more energy absorption members with anchoring means at fixed vehicle parts.

6 Claims, 3 Drawing Figures

RETENTION INSTALLATION FOR CHILDREN IN MOTOR VEHICLES

The present invention relates to an installation for the retention of passengers on seats in motor vehicles, especially of children on the rear seats in passenger motor vehicles with a chest and lap belt.

Such combination of chest belt and lap belt is known as proposed from the literature in connection with retention installations for children. Furthermore, a retention installation for children including a chest belt is described in the literature (Volume 245/74 Deutsche Kraftfahrtforschung und Strassenverkehrstechnik, figure 12) in which a further belt-band surrounds the lower body (pelvis) of the child within the belly area. Both belts are connected with each other by way of a net at the front side of the lower body. Two shoulder bands or straps are intended to serve for the position-retention of the chest belt while a band between the legs is intended to serve for the position-retention of the lap belt. For purposes of connecting the retention installation with the vehicle body, loops are arranged at the lap belt and at the chest belt. A belt-band which extends over the backrest of the seat and is anchored at the vehicle floor is guided through these loops, which is adapted to be connected at its upper end with a further anchoring means by way of a rapid closure mechanism.

The described retention installation is very complicated in its handling. Especially, less skilled persons require therefor a relatively large amount of time during the fastening of the retention installation on the child. Such difficulties are the cause not to use this installation in short distance drives, especially in the city. From there, it is only one further step not to use the retention system at all any more.

For purposes of rapidly freeing the child in case of danger, an assisting person should be able to recognize as quickly as possible how the child is to be freed from the belts. The prior art retention installation described hereinabove fulfills this requirement only inadequately.

The connection of chest and lap belt by way of loops with the beltband tensioned over the backrest leaves a great amount of play for the movement of the child. This leads in a disadvantageous manner to the fact that no retention is provided for the child during curve drives and during sharp braking. The safety of the child during normal drives is thus inadequate.

A further disadvantage of the described prior art retention installation is to be seen in the lap belt. The latter leads to serious internal injuries in case of a front-end impact of the vehicle at higher velocities (about 50 km/h) which, depending on gravity of the impact, may be fatal. Also, the band between the legs of the child which serves for the positional retention of the lap belt is a source for injuries at the lower body of the child.

The retention installation described hereinabove is additionally so constructed that the known disadvantage for the chest belt exists in full. The disadvantage resides in that in case of an accident, though the chest is retained, the head by reason of its free movability carries out a rotatory movement until it impinges on the chest and then rapidly snaps back. During this roll-in movement of the head, considerable accelerations occur at the same which already in case of a front end collision within the velocity range of the vehicle of about 50 km/h lead to peak values which pass beyond tolerable time spans. The consequence thereof is either permanent brain damage or injuries in the brain leading to death. It has become customary for evaluating the seriousness of brain injuries by the influence of accelerations acting at the head to utilize for that purpose the figures according to the head injury criterion—abbreviated HIC. According thereto, the HIC value should be about 1,000 for adults in the retention during a front end impact of the motor vehicle with a velocity of 50 km/h. Observations in connection with other retention systems for children, whereby the head is stimulated into the same movement as described above, have indicated HIC values which far exceed the figure of 1,000. The conclusion must be drawn therefrom that similar conditions exist with the described prior art retention system.

Furthermore, it is to be noted that with the roll-in event of the head and with the accelerations occurring thereby, the neck of the vehicle passenger is exposed to high tensional and bending forces. Aggravating thereto is the circumstance that with children having a body support and retention structure for the head which is as yet only slightly loadable, the head is relatively heavy yet in relation to the rest of the body so that it may also lead to fatal injuries within the area of the neck.

Finally, a disadvantage results from the connection of the chest and lap belt of the described prior art retention system with the belt-band tensioned over the backrest by way of the loops in such a manner that the child in the rebound phase of the impact is lifted off from the seat bench and the snapping-back head of the child does not impinge against the backrest but instead against the hat storage shelf. The neck is thereby overstretched in the rearward direction over the upper edge of the backrest which may also lead to fatal injuries.

The present invention is therefore connected with the task to so construct an installation retaining the vehicle passengers, especially a child, in the highly loadable body areas of the pelvis and of the chest that, on the one hand, a safe retention is assured for the child under all driving conditions of the vehicle while, on the other, with an accident within the velocity range of 50 km/h, the stress value of 1,000 according to HIC established for adults in relation to the head of the vehicle passenger is significantly not reached, i.e., the values which occur fall far short of this 1,000 value of HIC. However, the requirements as regards comfort for the child as well as simple manipulation of the retention installations should also be fully fulfilled.

The underlying problems are solved according to the present invention in that the chest belt is connected with two belt-bands which are arranged extending to the rear of the vehicle passenger over a backrest and, on the one hand, form with their end sections deflected within the corner area of the seat surface and backrest, the lap (pelvis) belt while on the other, they cooperate with anchoring means at fixed vehicle parts by way of energy absorption members.

The retention of the child takes place uniformly at the chest and at the pelvis by means of the retention system constructed according to the present invention. As is known, with children, the center of gravity of the upper body is located relatively high by reason of the disproportionately large head-weight, whereby especially with children the "jack-knife-like" forward displacement of the upper body appears in a more pronounced manner. As a result thereof, the two belt-bands are stressed at the instant of a starting retention during an accident above all by way of the chest belt. As a result of this stressing of the belt-bands, the same exert, on the one hand, a tension on the lap (pelvis) belt and, on the other, act on an energy-absorption member. The tension at the lap belt effects a rapid elimination of the belt looseness so that the lap belt extends in an advantageous manner tightened over the upper thighs and the pelvis of the child very soon after the start of the retention. It is avoided with certainty in this manner that the child slips through under the lap belt (so-called submarining effect) and as a result thereof, suffers injury in the soft zones of the body. The described tensioning of the lap (pelvis) belt effects additionally in an advantageous manner an optimum retention in case of an impact directed essentially transversely to the driving direction as well as in case of a roll-over of the motor vehicle.

With the response of the energy absorption member, the upper body of the child carries out a forward displacement decelerated or braked by the energy dissipation. Up to the response of the energy absorption member, the chest belt effects the known rotatory movement of the head. The roll-in movement of the head remains preserved over the entire occurrence of the braked forward displacement of the upper body. By the superimposition of the two events, the head moves along a curved path with large diameter which is relatively uniformly curved in its course. As measurements have now indicated in case of a front end impact of 50 km/h, smaller accelerations and decelerations, especially smaller deceleration peaks occur at a head moving along such a path so that the HIC value of 1,000 which is used for comparison purposes is markedly not reached in an advantageous manner, i.e., the value actually reached falls markedly below this HIC value of 1,000. However, the danger is considerably lessened therewith that children in case of accidents up to 50 km/h suffer already such injuries in the brain, head or neck which lead either to death or cause a permanent damage.

Accordingly, it is an object of the present invention to provide a retention system for children in motor vehicles which avoids by simple means the aforementioned shortcomings and drawbacks encountered in the prior art.

Another object of the present invention resides in a retention system for children in motor vehicles which is simple in construction, yet effective to prevent serious injuries.

A further object of the present invention resides in a retention installation for children in motor vehicles which affords substantial comfort to the children during normal drive, yet protects the same against injury in case of front end collisions or lateral impacts.

Still another object of the present invention resides in a retention system for children in motor vehicles, particularly for the back seats in passenger motor vehicles which are simple to handle, and which enable even an unskilled person to readily install the same and especially rapidly free a child from the retention system in case of imminent danger.

These and other objects, features and advantages of the present invention will become more apparent from the following description when taken in connection with the accompany drawing which shows, for purposes of illustration only, one embodiment in accordance with the present invention, and wherein.

Figure 1:
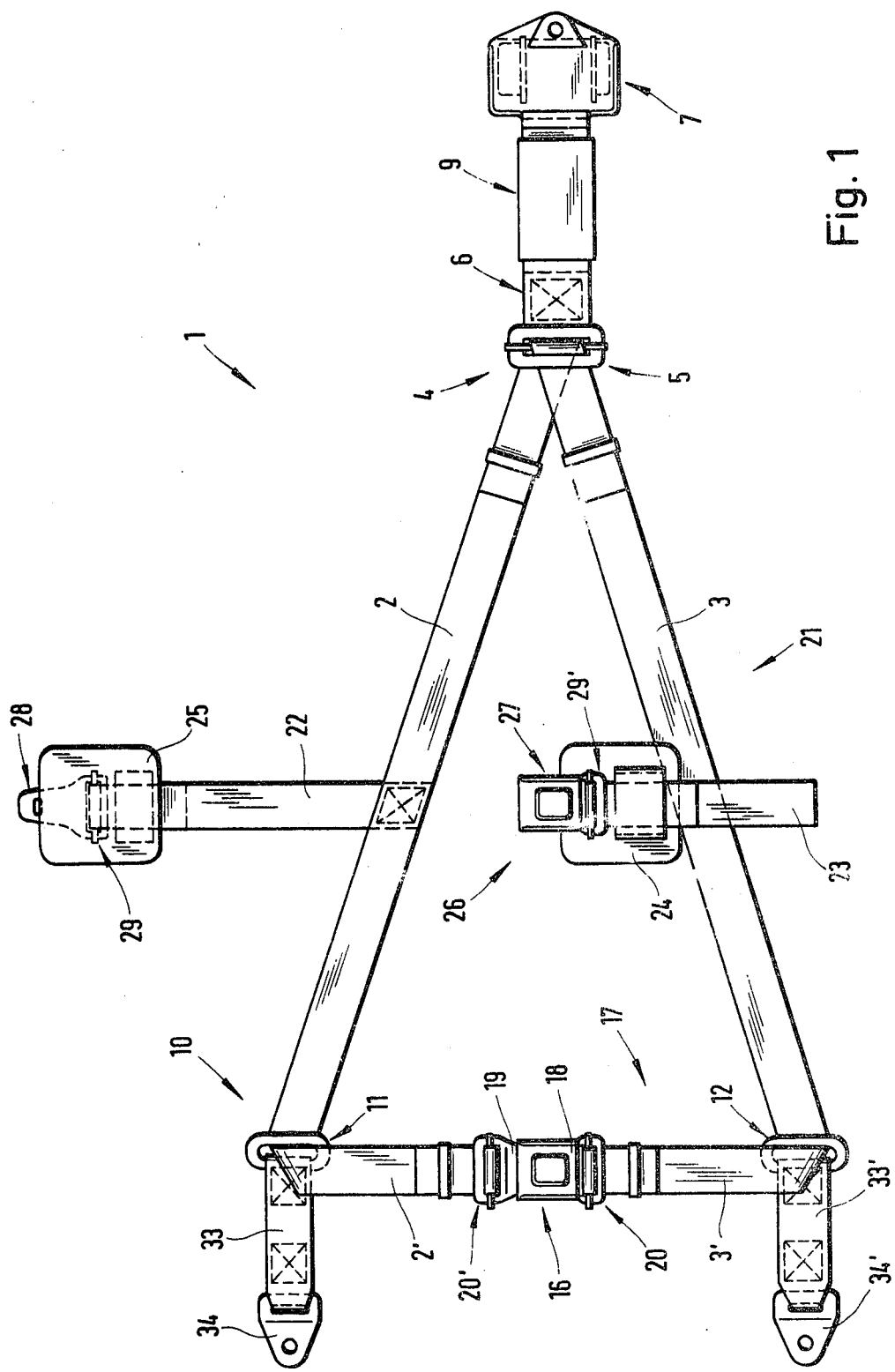
FIG. 1 is a view on the retention system in accordance with the present invention, illustrating the construction thereof.
Figure 3:
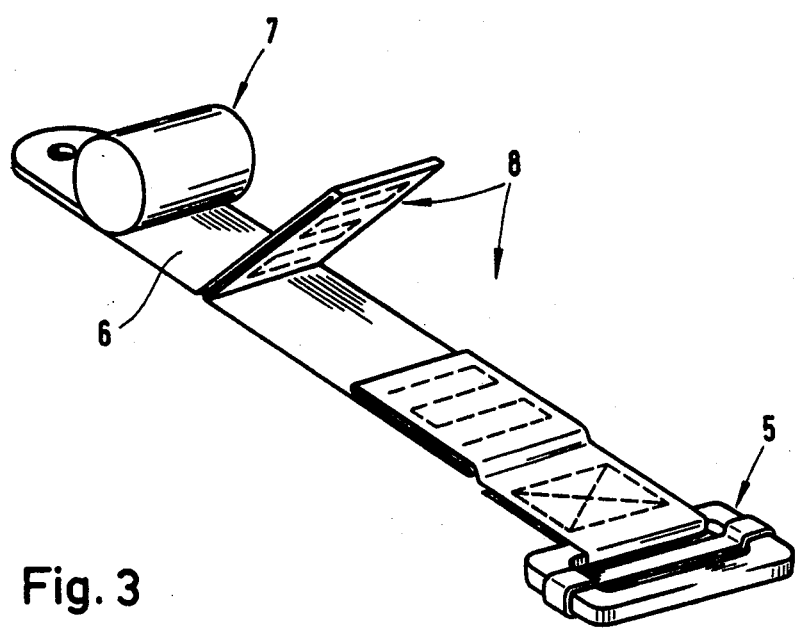
FIG. 3 is a perspective view of a tear member in the belt-band of a retractor.

Referring now to the drawing wherein like reference numerals are used throughout the various views to designate like parts, and more particularly to FIG. 1, the retention installation generally designated by reference numeral 1 according to this Figure includes two belt-bands 2 and 3 converging V-shaped toward one another. The belt-bands 2 and 3 converging at 4 cooperate with a conventional length-adjustment fitting 5. The length adjustment fitting 5 is arranged at a belt-band 6 which is connected with an automatic rewind mechanism 7, commonly referred to as automatic retractor. The belt-band 6 includes between the automatic retractor 7 and the length-adjustment fitting 5 at least one of the tear-members for the energy absorption, illustrated in FIG. 3. The tear or rip member 8 may be formed of a section of the belt-band 6 which is folded once and sewn together. The tear member 8 is held resting on the belt-band 6 by means of a cuff or sleeve 9 (FIG. 1) made of flexible and tearable material. As a result thereof, the belt-band 6 can be wound maximally.

Figure 2:
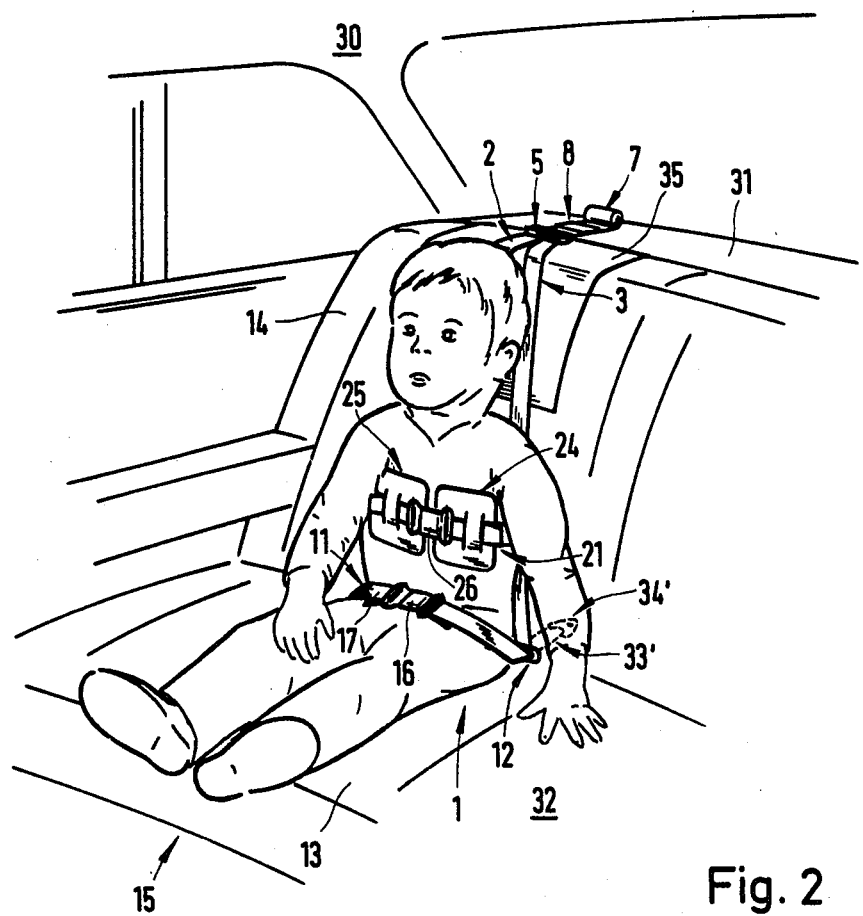
FIG. 2 is a somewhat schematic perspective view on the rear seat of a passenger motor vehicle, illustrating the arrangement of the retention system of the present invention at such rear seat.

Each of the belt-bands 2 and 3 is guided by way of fittings 11 and 12 whereby the fittings 11 and 12 according to FIG. 2 are arranged within the corner area of the seat surface 13 and of the backrest 14 of a seat 15. The fittings 11 and 12 are constructed as conventional passthrough fittings and serve the deflection of the belt-bands 2 and 3 in their end sections 2' and 3'. The end sections 2' and 3' are so constructed as to be connectible into a lap (pelvis) belt 17 by way of a closure conventional mechanism 16. The closure mechanism 16 may be formed of a lock 18 and of a lock tongue 19. A length-adjustment fitting 20 and 20' of conventional construction for the respective end section 2' and 3' is structurally integrated with the lock 18 and the lock tongue 19.

The belt-bands 2 and 3 are connected intermediate the lap belt 17 and the upper length-adjustment fitting 5 with a chest belt generally designated by reference numeral 21. The chest belt 21 consists of a band 22 arranged at the belt-band 2 and of a band 23 arranged at the belt-band 3. The chest belt-bands 22 and 23 are securely connected with the respective belt-bands 2 and 3. However, they may also cooperate with the same friction-lockingly by way of loops. One cushion plate 24 and 25 each is arranged on the chest belt-bands 22 and 23. The cushion plates 24 and 25 are displaceably arranged on the respective band 22 and 23 by means of shackles or the like. Both chest bands 22 and 23 are adapted to be coupled with one another by way of a closure mechanism 26. Appropriately, the closure mechanism 26 is identical with the closure mechanism 16 at the lower body belt 17. Additionally, both the locks 27 as also the lock tongue 28 of the mechanism 26 are structurally integrated each with a conventional length-adjustment fitting 29 and 29' for the respective chest belt-band 22 and 23.

An arrangement of the described retention installation 1 at the backseat 15 of a passenger motor vehicle 30 (not shown in detail) can be seen from FIG. 2. In this arrangement, the automatic retractor 7 is anchored at fixed vehicle parts on the hat storage shelf 31. In the selection of the place for the automatic retractor 7, attention must be paid above all that the upper length-adjustment fitting 5 for the belt-bands 2 and 3 which is located away from the automatic retractor 7 essentially by the length of the tear member 8, lies at the greatest possible distance from the head of the child. It is to be avoided thereby in case of an accident during the rebound phase that the child hits with the head against the fitting 5. From the length-adjustment fitting 5, the belt-bands 2 and 3 extend over the backrest 4 up to the through-pass fittings 11 and 12. The latter are connected, for example, by way of belts 33 and 33' extending between the seat bench 32 and the backrest 14 as well as by way of pivotal connecting fittings 34 and 34' with fixed vehicle parts. If a child is seated on the seat bench 32 between the through-pass fittings 11 and 12, then at first the position of the chest belt 21 at the chest of the child has to be fixed. This takes place by way of the adjustment of the beltbands 2 and 3 extending behind the child over the backrest 14 at the upper length-adjustment fitting 5. Thereupon, the chest belt-bands 22 and 23 are matched in their length to the chest circumference of the child by means of the length-adjustment fittings 29 and 29' and are coupled with one another by the locking mechanism 26. The two cushioned plates 24 and 25 are displaced against one another on the chest belt-bands 22 and 23 until respective sections come to lie under the lock 27 as well as under the lock tongue 28 for purposes of avoiding unpleasant pressure places. The cushioned plates 24 and 25 may be equipped on the sides facing the body, with surfaces adhering at the clothing of the child or cooperating therewith by strong frictional contact for purposes of retaining the chest belt 21. Also the application of the chest belt 21 can be facilitated therewith. Finally, it is also avoided by the cushion plates 24 and 25 that the chest belt 21 twists in case of a forward displacement of the upper body conditioned on an accident.

Also, the known shoulder bands (not illustrated) may serve for the retention of the chest belt 21 which are connected with the belt-bands 2 and 3, preferably by way of rapidly disengageable devices.

Finally, the end sections 2' and 3' of the belt-bands 2 and 3 which form the lap (pelvis) belt 17 are to be adjusted in their respective length to the pelvis circumference by means of the length-adjustment fittings 20 and 20'. In the length-adjustment of the lap belt 17 as well as of the chest belt 21, care must be taken that the respective closure mechanisms 16 and 26 come to lie approximately one above the other in the body center. A quick location and disengagement of the locks 18 and 27 is assured therewith in case of emergency and thus a rapid freeing of the child out of the retention installation 1 is possible in an advantageous manner also by third parties.

The retention installation 1 can be utilized in an advantageous manner for children at the age of 3 to 10 years by reason of the large number of length-adjustment possibilities with sufficient length of the individual bands of the lap belt 17, chest belt 21 as well as of the belt-bands 2 and 3. However, in order to assure for each child from this age group who generally becomes increasingly heavier with increasing age the safety according to the present invention in case of an accident, energy absorption members with different characteristics are provided. For determining the respective characteristic, the aforementioned age group is subdivided into several weight classes. With an energy absorption member integrated in the belt-band 6 of the automatic retractor 7 in the form of a tear member 8, the respective characteristic is attained both by the number of tear members as also by the way in which they are sewn together. If a child has exceeded with his body weight the upper limit of a weight class, then the previous automatic retractor together with its belt-band is exchanged for another with tear members of higher ratings in the belt band.

The child is able to move with his upper body in an advantageous manner by way of the belt-band 6 which can be unwound and rewound by the automatic retractor 7. In order to avoid thereby a damage of the upholstery within the area of the upper edge of the backrest 14 by rubbing and wear action of the belt-bands 2 and 3 as well as the length-adjustment fitting 5, an apron 35 is placed underneath the same. This apron with a corresponding material may reduce in a favorable manner the friction resistance during the prestressing of the retention installation 1 by the automatic retractor 7.

A further advantage of the retention installation 1 resides in the combination with a seat cushion for smaller children. The seat cushion (not shown) made, for example, of hard foamed material is arranged on the seat bench 32 between the pass-through and deflection fittings 11 and 12. The child can therewith bring the legs into a non-fatiguing, angularly bent position.

Furthermore, a considerably more steep course with respect to the through-pass and deflection fittings 11 and 12 will result for the lower body lap belt 17, whence a still better retention at the pelvis of the child is achieved.

Finally, a headrest is provided for the case that the head of the child is disposed above the upper edge of the backrest by reason of the child's body size or by reason of being seated on the seat cushion.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. An installation for the retention of a child on seats in motor vehicles, comprising a chest belt means and a lower body belt means, characterized in that the chest belt means is connected with two belt-bands which extend, behind the vehicle passenger, from anchoring means fixed at a vehicle part located rearwardly of the passenger with which they cooperate by way of energy absorption means, downwardly over the backrest of a seat to pass-through fitting means connected with a fixed part and arranged at the junction of the seat surface and backrest, the end sections of said two belt bands being deflected by said pass-through fittings to extend in front of the lower body portion of the child to form the lower body belt means and said chest belt bands extending between the upper body portion and the arms of the child and adapted to be coupled with one another in the region of the child's chest.

2. A safety belt system according to claim 1, characterized in that the two belt bands extend through a common length adjustment fitting means which is connected with an energy absorption means whereby the position of said chest belt bands connected with said two belt bands is adjustable to position them at the height of the child's chest.

3. A safety belt system according to claim 1, characterized in that a cushion plate is arranged at each chest beltband, each cushion plate being displaceably connected with the respective chest belt-band and including a section adapted to be arranged between closure means for coupling the belt bands and the chest of the passenger, the cushion plates being provided, on the side facing the chest of the child, with surfaces adapted to adhere to the child's clothing.

4. A safety belt system according to claim 1, characterized in that the energy absorption means is constructed as a tear member in a belt band consisting of a folded and sewn-together section thereof, and the belt band is connected with an automatic retractor attached to a fixed vehicle part, the retractor and the belt band with the tear member forming an exchangeable unit.

5. An installation according to claim 4, characterized in that the tear members, as to number and manner of sewing together, are constructed according to weight classes of children to be retained.

6. An installation according to claim 1, characterized in that an apron of a material with a low sliding friction value is placed underneath the belt-bands within the area of the upper edge of the backrest.

* * * * *